March 20, 1951     H. A. HOLMBERG     2,546,032
FRUIT AND VEGETABLE CUTTER AND PEELER
Filed Sept. 19, 1945
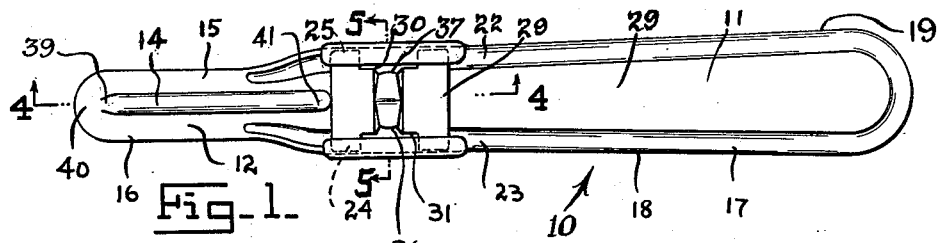
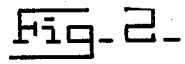
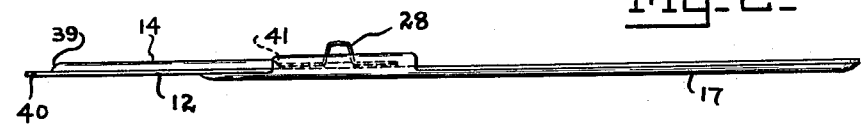
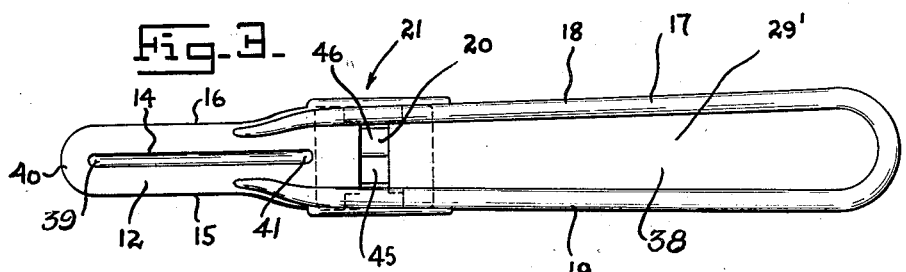
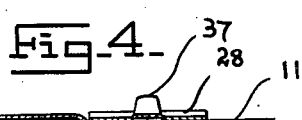
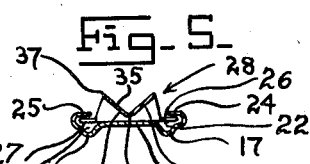
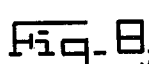
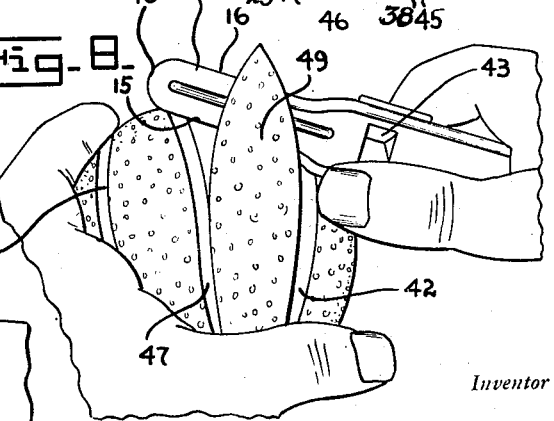
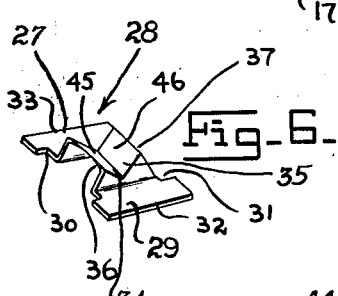
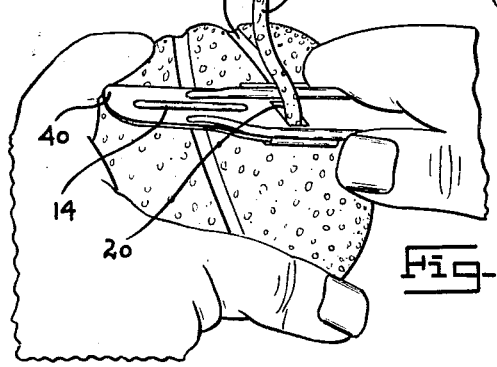
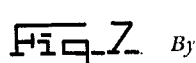
Inventor
Hans A. Holmberg
By Clarence A. O'Brien and Harvey B. Jacobson
Attorneys

Patented Mar. 20, 1951

2,546,032

UNITED STATES PATENT OFFICE 2,546,032

FRUIT AND VEGETABLE CUTTER AND PEELER

Hans A. Holmberg, Conklin, N. Y.

Application September 19, 1945, Serial No. 617,326

1 Claim. (Cl. 30—24)

My invention relates to culinary articles and has for an object to provide a device for cutting and peeling citrous fruits, vegetables, etc.

Another object of my invention is to provide a device for ornamenting citrous fruits.

Another object of the invention is to provide a device for cutting a narrow kerf of skin or pellicle from a fruit or vegetable and then separating the skin from the fruit.

A further object of this invention is to provide a cutter for separating the peel from fruit which may be operated in opposing directions.

A still further object of the invention is to provide a skin separating device having a reversible skin plow connected therewith.

Other features and advantages will become more readily apparent from the following description and the accompanying illustrative drawings in which:

Figure 1 is a plan view of my invention,

Figure 2 is an edge view thereof,

Figure 3 is another plan view, from the reverse side of the device,

Figure 4 is a section on line 4—4 of Figure 1,

Figure 5 is a section on line 5—5 of Figure 1,

Figure 6 is a detail perspective view of a cutter or plow element,

Figure 7 is a diagrammatic view illustrating one operation of the invention, and Figure 8 is a similar view showing another operation thereof.

In the above drawings as well as in the specification to follow, the same characters of reference indicate the same parts throughout.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claim. And while I have stated the primary field of utility of my invention it remains obvious that it may be employed in any other capacity wherein it may be found applicable.

My device consists of a shank handle 11 with a terminal spatulate end 12, provided with an elongated struck out rib 14, intermediate its side edges 15 and 16. There is provided a similar struck out stiffening rib 17, at the surrounding edges 18 and 19, of said handle.

Adjacent the juncture of the handle 11, and spatula 12, there is provided a cut out 20, between the said ribs 18 and 19, and adjacent this intermediate portion 21, of the device the edges of the handle are extended and returned over the channels 22 and 23, formed by said rib and provide trackways 24 and 25, between which the side edges 26 and 27, of a plow 28, is removably held.

The said plow member 28 (shown in detail in Figure 6 of the drawings) consists of a flat plate 29, slidable upon the body portion 29', of the handle 11. The plate is provided with side cut outs 30 and 31, intermediate its ends 32 and 33, and intermediate these cut outs the center of the plate is struck out in opposing directions from the center 34, providing a V-shaped wall 35, in cross section, the projected edges 36 and 37, form cutters projecting downwardly from the plate and below the under surface 38, of the device.

The rib 14, has special functions, its end 39, acts to shove up or out a peel from the body of a fruit, when the spatula end 40, is shoved under said skin, after which the entire rib functions in the same manner. A second purpose of the rib is to stiffen the spatula and as the third function its terminal 41, acts as a stop for limiting the outer movement of the plate 29, whereby the said plow is held directly over the cut out 20.

The plow 28, is provided with two cutting edges for specific purposes, the first being that it will cut a furrow such as 42 (see Figure 7) either toward or from the user; second, if one of the edges 36 or 37, should become dulled, the plate 28, may be reversed on the device and the other edge used. The inclines 45 and 46, of the plow are for directing the strips of skin 44, through the opening 20, of the handle.

As indicated in Figures 7 and 8, a fruit may be plowed out in spaced furrows 42, 47 and 48, etc., and then the intervening layers 49, of the skin removed with the spatula 12, in the manner illustrated.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

In a fruit peeler, a shank having tracks formed on opposite longitudinal edges thereof, a plow having opposite ends disposed in said tracks, and angularly inclined cutter blades disposed toward an apex intermediate the opposite ends of said plow so that the plow may be manually operated successively in opposite directions without relocating the shank in the operator's hand.

HANS A. HOLMBERG.

REFERENCES CITED

The following references are of record in the file of this patent:

UNITED STATES PATENTS

| Number | Name | Date |
| --- | --- | --- |
| 1,771,296 | Harley et al. | July 22, 1930 |
| 2,054,480 | Leitshuh | Sept. 15, 1936 |
| 2,258,448 | Gesell | Oct. 7, 1941 |